Figure 4:
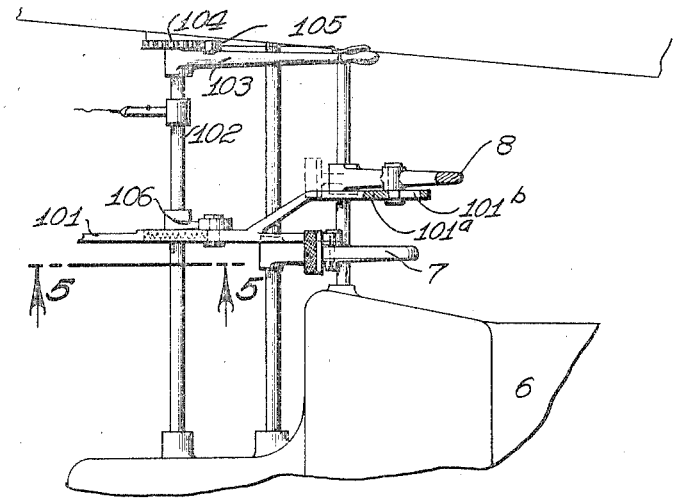

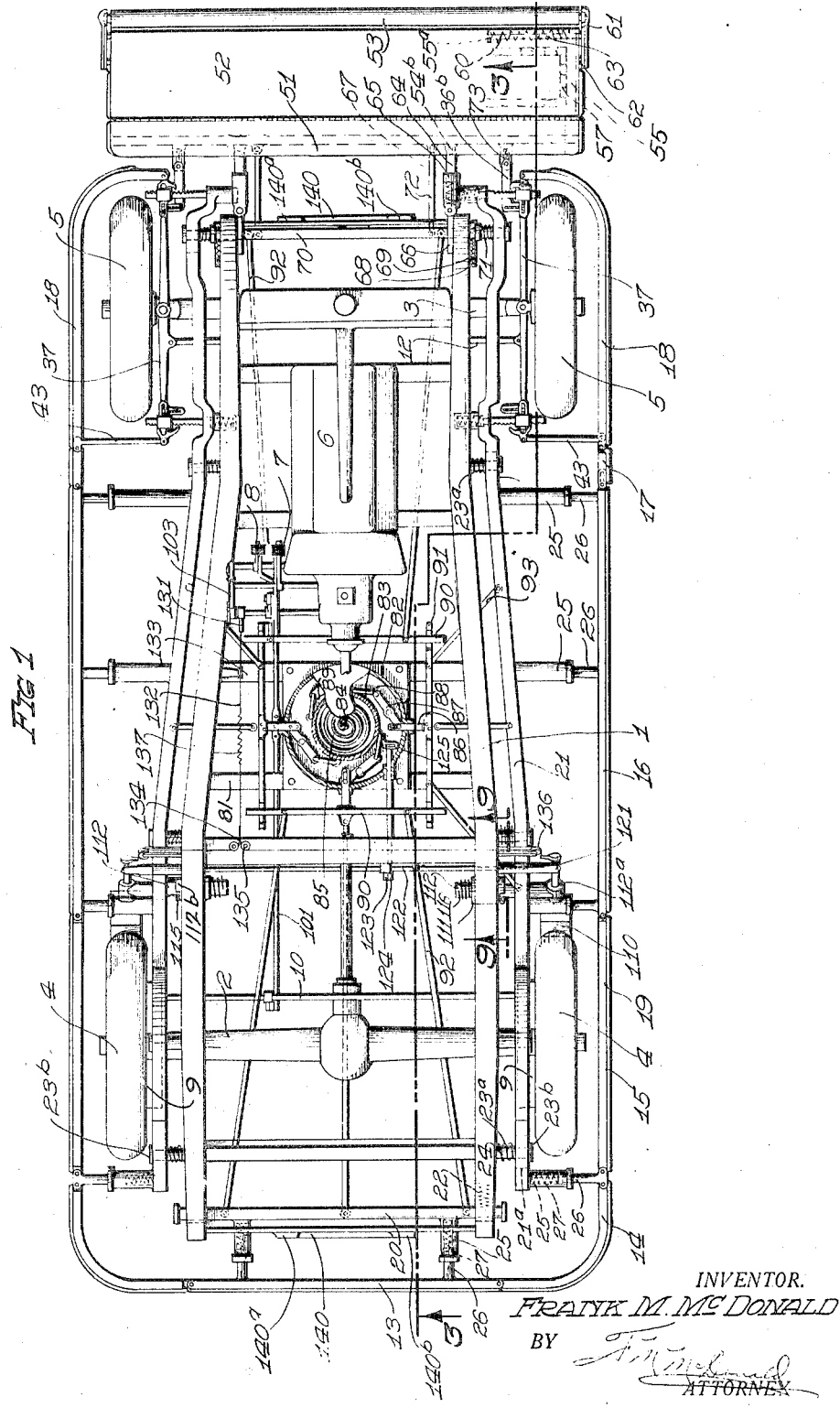

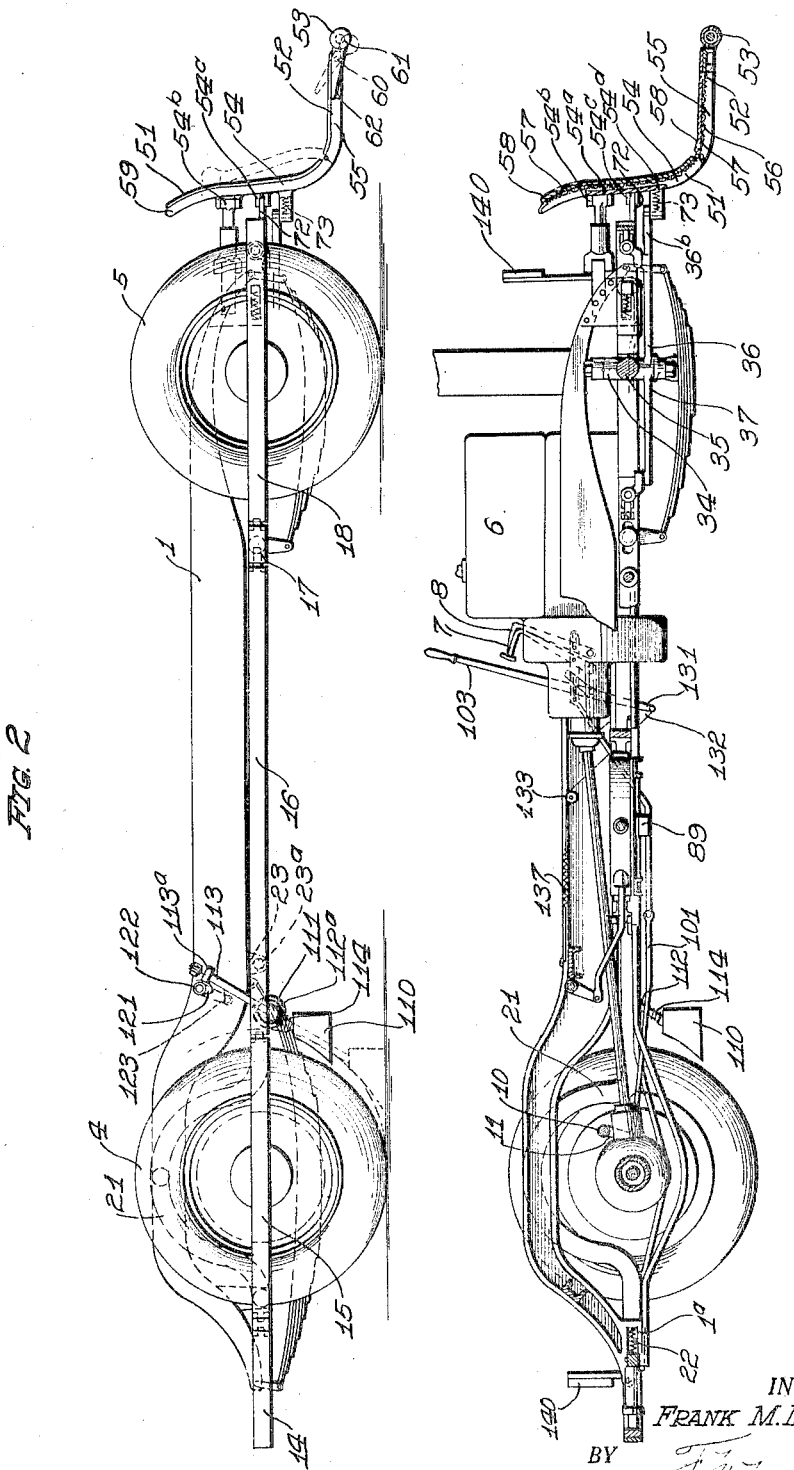

INVENTOR.
FRANK M. McDONALD
BY
ATTORNEY

July 16, 1929.    F. M. McDONALD    1,720,660
VEHICULAR LIFE AND PROPERTY SAFETY DEVICE
Filed Oct. 6, 1927    4 Sheets-Sheet 4
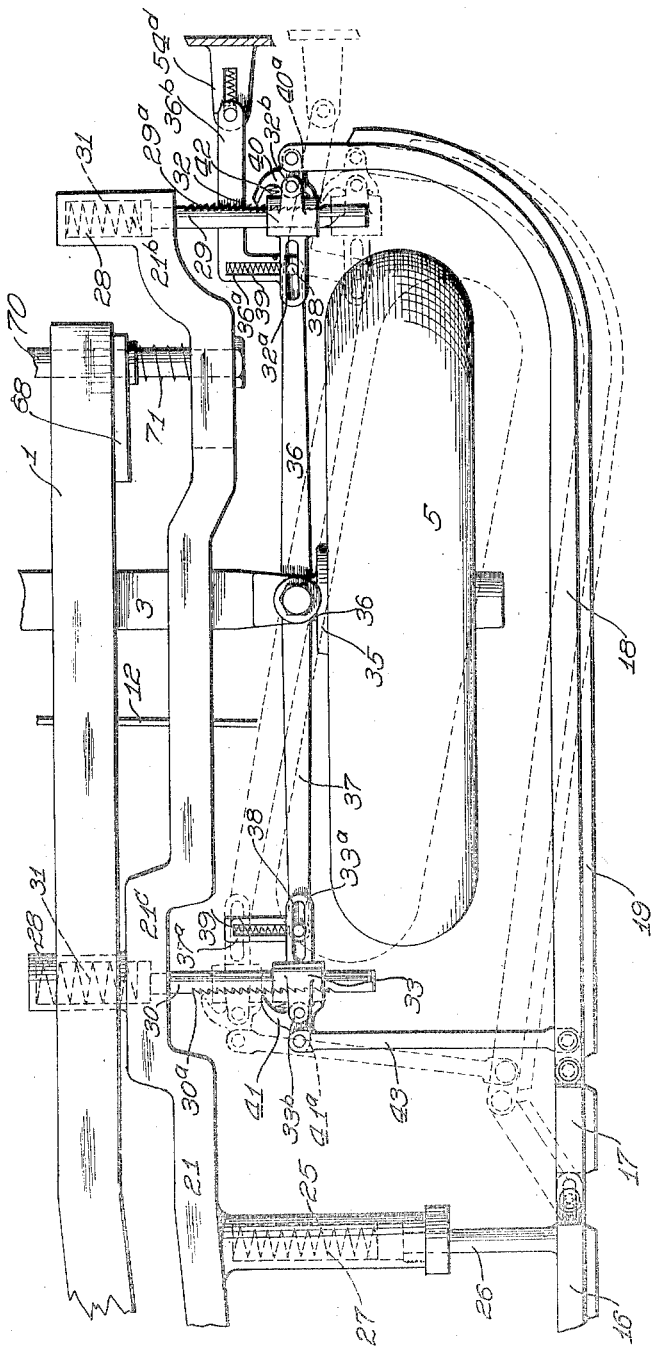
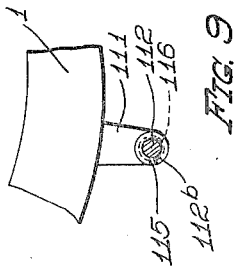
INVENTOR.
FRANK M. McDONALD
BY Patented July 16, 1929.

1,720,660

UNITED STATES PATENT OFFICE.

FRANK M. McDONALD, OF NEW YORK, N. Y.

VEHICULAR LIFE AND PROPERTY SAFETY DEVICE.

Application filed October 6, 1927. Serial No. 224,387.

My invention relates to safety apparatus for vehicles of various types and character for protecting said vehicles and the occupants therein, as well as pedestrains and for protecting other life and property.

The objects of my present invention are: first, to provide novel bumper means for vehicles which completely surrounds the vehicle and which is so constructed that, in case of collision or in case an obstruction is encountered, the shock will be absorbed by the bumper means and will not be imparted to any vital parts thereof; second, to provide apparatus of this class whereby the brakes of the vehicle will be automatically applied in case of collision or in case an obstruction is encountered; third, to provide apparatus of this class for vehicles whereby brake members or blocks will be automatically projected in front of and under the wheels so that the wheels are adapted to ride on said members or blocks to facilitate the braking or stopping operation of the vehicle; fourth, to provide apparatus of this class in connection with vehicles whereby, in case of collision or when an obstruction is encountered, causing the brakes to be applied, the vehicle cannot proceed whether forwardly or backwardly until the brakes are released by auxiliary means; fifth, to provide apparatus of this class in which the auxiliary means mentioned is adapted to simultaneously release the brakes, as well as remove the brake members or blocks from in front of the wheels; sixth, to provide bumper means of the class mentioned and supporting means therefor which are yieldably constructed and supported relative to each other and relative to the separate members of each means so that, in case of collision or in case an object is encountered, only the part of the bumper means colliding with the object is temporarily distorted or shifted, but at the same time connected with the brake means and other stopping means so as to automatically apply the same; seventh, to provide novel means for converting the impact, due to collision, into the desired motion for applying the brakes; eighth, to provide bumper means of this class which is shifted automatically with the front wheels when turning corners and still so connected with the whole safety apparatus so as to automatically apply the brakes in case the shifted portion of the bumper means is collided with or encounters an obstruction; ninth, to provide novel fender means at the forward portion of the vehicle in conjunction with the bumper means mentioned which will be shifted with the front wheels when the vehicle turns corners, and which is so arranged as to catch pedestrians, animals or the like in such a manner as to protect them to the greatest extent from all possible injury; tenth, to provide such fender means which may be shifted out of the way when it is not desired to use the same; eleventh, to provide such fender means which will be automatically raised a slight distance above the ground when the forward portion of the fender means encounters a slight obstruction in the roadway due to roughness of the road bed; and, twelfth, to provide, as a whole, a novelly constructed and arranged apparatus of this class and one which is simple of construction proportionate to its functions and one which is durable and which will not readily get out of order.

Figure 5:
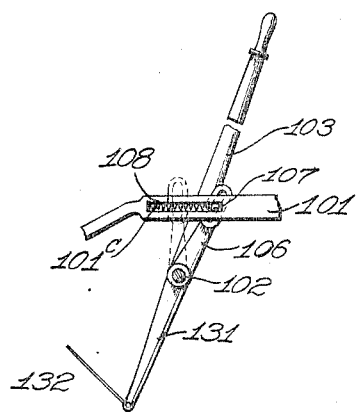
Figure 6:
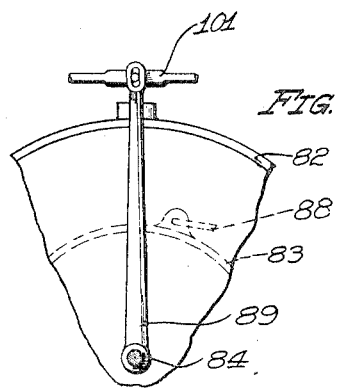
Figure 7:
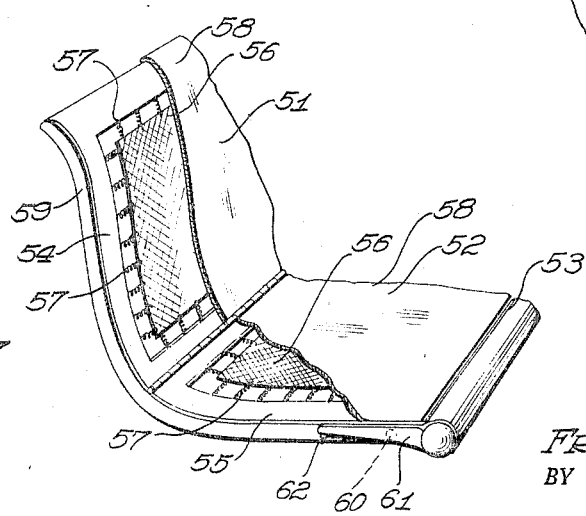

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a plan view of a vehicle chassis showing my safety apparatus incorporated therewith, the relation of the parts with each other being mainly diagrammatic, certain parts and portions being broken away and in section to facilitate the illustration; Fig. 2 is a side elevational view thereof, showing various parts of the fender at the front end of the vehicle by dotted lines in certain shifted positions and also showing by dotted lines the brake block projected in front of the rear wheel and the rear wheels advanced and raised slightly so as to mount the blocks; Fig. 3 is a sectional elevational view thereof, taken longitudinally of the vehicle and on the line 3—3 of Fig. 1; Fig. 4 is an enlarged fragmentary view in plan showing the relation of the foot pedals with the brake actuating rods, and the lever means for releasing the brakes after the same have been automatically applied; Fig. 5 is a fragmentary side elevational view thereof taken at 5—5 of Fig. 4; Fig. 6 is an enlarged fragmentary view in plan showing the brake actuating arm connected with the brake actuating rod and also showing the relation of the arm with the means for converting the impact on the bumper means into the desired motion: Fig. 7 is a fragmentary perspective view on an enlarged scale of the fender at the front end of the vehicle, a portion of the outer flexible covering of the cover being removed to facilitate the illustration; and, Fig. 8 is an enlarged fragmentary view in plan showing the bumper means at one of the front wheels of the vehicle and the means for shifting such part of the bumper means with the front wheels, the wheels and the bumper means being shown by dotted lines shifted to a certain position as when the vehicle turns a corner. Fig. 9 is a detail view of a bracket.

Like characters of reference refer to similar parts and portions throughout the views of the drawings.

The chassis of the vehicle, including the frame 1, rear axle 2, front axle 3, rear wheels 4, front wheels 5, engine 6, brake pedal 7, clutch pedal 8, rear wheel brakes 9, transverse brake actuating rod 10, brake actuating arm 11, and the steering rod 12, is, for all intents and purposes, substantially the same as that now employed in conventional vehicle construction.

The whole of the rear and sides of the vehicle are protected and surrounded, at a height substantially that of the height of the conventional bumper now in use, by a yieldable bumper means, consisting of a rear bumper section 13, rear corner sections 14, rear wheel sections 15, side sections 16, connecting link section 17, and the front wheel section 18. All of said bumper sections are made of rigid metallic bars and all pivotally connected together, forming a substantially continuous bumper. All of the bumper sections are covered at their outer sides by a yieldable covering, such as rubber, or other yieldable material, 19.

Said bumper sections are yieldably connected to and supported by yieldably mounted supports, consisting of the rear bumper supporting member 20 and the side bumper supporting members. The rear bumper supporting member 20 consists of a square rod which is slidably mounted at its opposite ends in horizontal slots 1$^a$ at the rear ends of the side members of the main frame 1, said supporting member 20 being held in a rearward position by compression springs 22 positioned in said slots. The member 20 is also permitted to shift longitudinally, or transversely with the chassis, in said slots, but is prevented from being removed from said slots by enlargements at the ends of the member. The side supporting members 21 are positioned at the outer sides of the side members of the main frame and are spaced from said main frame, but are so mounted as to be shifted toward the same, and also longitudinally relative thereto. Said side supporting members 21 are mounted on the side members of the main frame by brackets 23 which extend downwardly from the main frame and are provided with laterally and outwardly extended supporting pins or lugs 23$^a$, as shown in Figs. 1 and 2. These pins or lugs 23$^a$ extend through elongated transverse slots 21$^a$ of the side supporting members 21, as shown best in Fig. 1. On said pins or lugs 23$^a$ are positioned compression springs 24 which normally hold the side supporting members 21 away from the main frame, said members 21 being, however, prevented from being forced from the pins 23$^A$ by enlargements 23$^b$ at the outer ends of said pins or lugs 23$^a$. Such mounting of the side bumper supporting members 21 permits the latter to be shifted inwardly, as well as longitudinally relative to the frame.

The rear bumper section 13 is yieldably supported relative to the bumper supporting member 20 by spring means which consist of cylinders 25 secured to the outer sides and near the ends of the member 20, plungers secured to the inner side and near the ends of the rear bumper section 13 and extended into said cylinders, and compression springs 27 positioned in said cylinders against the inner ends of the plungers for normally forcing the plungers, and therefore the rear bumper section 13, outwardly. The pivotally connected ends of the rear corner section 14 and the rear wheel section 15 are similarly supported at the rear ends of the side bumper supporting member 21, and the side section 16 is also similarly supported at and intermediate its ends on the supporting member 1, all as shown best in Fig. 1.

Each of the front wheel bumper sections 18 is supported in a different manner relative to the front end of the corresponding side bumper supporting member 21 by reason of the shifting of the bumper section 18 with the front wheel. At the front end and at a distance from the front end of each side supporting member 21, are inwardly offset portions, designated respectively 21$^b$ and 21$^c$ as shown in Figure 8. Extending inwardly from these offset portions are cylinders 28 in which are reciprocally mounted respectively the inner enlarged ends of plungers 29 and 30, said plungers being forced outwardly from said cylinders to the maximum extent by means of compression springs 31 positioned in said cylinders, as shown best in Fig. 8. The reduced outer ends of the plungers 29 and 30 extend toward, but are positioned slightly ahead of and behind, respectively, of the front and rear edges of the front wheel 5. On the outwardly extended portions of the plungers 29 and 30, are reciprocally mounted slides 32 and 33 which are, respectively, provided with backwardly and forwardly extended slotted arms 32ª and 33ª. The conventional front axle of vehicles is provided at its opposite ends with bifurcated portions, between the furcations of which is pivotally mounted the spindle body, designated 34 in Figs. 3 and 6. Intermediate ends of this spindle body, is provided the conventional spindle 35 on which the front wheel is mounted. The conventional spindle bodies are provided with laterally extended arms to which the steering rod is connected. In my construction, however, I have provided a long forwardly extended arm 36 and a long rearwardly extended arm 37, the conventional steering rod 12 being connected to the rearwardly extended arm 37, as shown in Figs. 1 and 8. At the ends of said arms 36 and 37, are provided inwardly extended slotted portions 36ª and 37ª which extend substantially at right angles to said arms. Through the slots, in the slotted arms 32ª and 33ª, and the corresponding slots in the right angle slotted portions 36ª and 37ª of the arms 36 and 37, are extended pins 38 for pivotally connecting said arms to said slides. Within the slots of the slotted portions 36ª and 37ª of the arms 36 and 37, are positioned compression springs 39 which normally hold the pins 38 toward the normally outer end of the slots in said portions, for the purpose hereinafter set forth. On said slides 32 and 33, and at the sides thereof opposite the slotted arms, are provided lugs 32ᵇ and 33ᵇ, respectively, on which are pivotally mounted, respectively, the dogs 40 and 41. Said dogs are adapted, under conditions hereinafter related, to engage at their inner ends teeth 29ª and 30ª at the forward and rear sides of the outwardly extended portions of the plungers 29 and 30. Said dogs are held in disengaged relation from said teeth by means of compression springs 42 positioned intermediate the tooth engaging arm portions of the dogs and their respective slides. Said dogs are provided with outwardly extended arms 40ª and 41ª. To the outer end of the arm 40ª is pivotally connected the forward end of the front wheel bumper section 18, which section is curved inwardly at its front end partially around the front wheel, as shown in Figs. 8 and 1. The end of the arm 41ª of the dog 41 is pivotally connected by a link 43 to near the rear end of the front wheel bumper section. The rear end of the front end of the link section 17, which latter section is pivotally and longitudinally slidably connected at its rear end to the forward end of the forward end of the side bumper section 16, as shown best in Fig. 8.

As the vehicle is manipulated for making a right hand turn, the wheel is shifted to the dotted line position. Such shifting also shifts the arms 36 and 37 to the positions thereof, shown by the dotted lines. Said arms also shift the slides 32 and 33 to the positions shown by dotted lines thereof. Such shifting of the slides forces the front end of the front bumper section 18 outwardly and the rear end thereof inwardly, as shown by dotted lines. The pivotal and longitudinal sliding connection of the connection link section 17 permits free inward and outward shifting of the rear end of the front bumper section.

As the front wheel bumper section is collided with, the springs 42, normally holding the dogs outwardly, are compressed, permitting the ends of the dogs to engage the teeth of the plungers forcing the same inwardly and imparting the shock through the springs 31, in the cylinders 28, to the side supporting members 21 in a manner similar to the imparting of the shock of any of the other bumper sections to the side bumper supporting member 21, or the rear bumper supporting member 20. The shock against the front wheel bumper section 18 is imparted to the supporting member 21, irrespective of the positions of the front wheels and the bumper sections positioned to protect the same.

The fender at the front end of the vehicle is adapted to serve as a bumper for protecting the vehicle against collision, as well as for catching and protecting pedestrians, animals or the like who may be struck by the vehicle. This fender is a yieldable and soft supporting means, basket, or the like open at the front side, the vertical cross section of which is substantially on an ogee curve. This fender consists primarily of three sections, namely, a back section 51, a horizontal supporting section 52, hinged at its rear edge to the lower edge of the section 51, and a yieldably mounted yieldable roller 53 at the front edge of the section 52. The fender sections 51 and 52 are supported by substantially rectangularly shaped frames 54 and 55, respectively, which gives shape to said fender sections, said frames being pivotally connected or hinged as stated. In the central open spaces of said frames are yieldably supported shock absorbing members 56 which consist of wire netting and which are held taut and supported at their edges by means of coil tension springs 57 connected at their outer ends to the inner edges of the frames forming the openings therein. The outer sides of the frames, as well as the outer sides of the wire nettings 56, are covered by a yieldable covering 58 which may be made of rubber, heavy fabric, or other material. The lateral sides of the frames 54 and 55 are also preferably covered by strips of rubber or other yieldable material 59. Within and near the forward edge of the fender section 52, and at the opposite lateral sides thereof, are rotatably mounted pivot rods 60 which extend transversely to the longitudinal axis of the vehicle and project with their outer ends beyond the frame 55, as shown best in Fig. 1. The roller 53 extends the full transverse length of the fender section 52 and is provided at its opposite ends with terminal pintles which are revolubly mounted on the forward ends of roller supporting arms 61 which are mounted intermediate their ends on the extended ends of the pivot rods 60 and in non-revoluble relation thereto. Also projecting beyond the lateral sides of the frame 55 and backwardly from the pivot rods 60, are stop pins 62 which are adapted to be engaged by the rear ends of the arms 61. Around the pivot rods 60 and within the front fender section 52, are positioned coil springs 63 which are secured at their normally outer ends to said pivot rods and at their inner ends to the lugs in which the ends of said pivot rods are mounted. These springs are adapted for holding the roller 53 immediately in front of the fender section 52 with the inner ends of the roller supporting arms 61 in engagement with the stop pins 62. As an obstruction is encountered by the fender, such as the legs of a pedestrian or of an animal, or any other object or roughness in the roadway, the roller 53 is adapted to be turned downwardly, as shown by dotted lines in Fig. 2, facilitating the catching of the pedestrian or animal on the fender with less injury to the legs, and in case of an object or roughness in the roadway, for raising the fender section 52 slightly above the roadway. Both the roller 53 and the arms 61 are covered by suitable yieldable material such as rubber or otherwise. The normal height of the roller above the roadway is such as to catch the pedestrian at or below the ankles or the animal at or below the feet joints so that it will not be thrown forwardly, but will be thrown off its balance and deposited on the fender. In case it is desired not to use the fender as described, the same may be pulled upwardly about the hinged joints to the position shown by dotted lines in Fig. 2.

At the back side of the frame 54 of the fender section 51 is provided a supporting plate for the suitable supporting portion 54ª which is provided at its back side and near its ends with supporting lugs 54ᵇ to which are pivotally connected the forward plungers 64 which extend with their rear ends into cylinders 65 which are pivotally mounted at their rear ends on brackets 66 secured to the inner sides of the front ends of the side members of the main frame 1. The plungers 64 are forced to the outer portions of the supporting cylinders 65 by compression springs 67 positioned within the cylinders.

At the outer sides of the front ends of the side members of the main frame, are secured longitudinally slotted brackets 68 through which the opposite ends of the square supporting rod 70 extends, said rod being normally held in a forward position by compression springs 69 positioned within the slots of the brackets 68. The portions of the rod 70 extending beyond the brackets 68, extend through elongated transverse slots near the forward ends of the bumper supporting members 21, and support the latter members thereon. On the outer ends of the rod 70, are positioned compression springs 71, which normally force the forward ends of the supporting members outwardly, as described in connection with the springs 24. The extreme outer ends of the rod 70 are also enlarged to retain the supporting members 21 thereon.

The rod 70 is pivotally connected near its ends, by means of links 72, to lugs 54ᶜ at the back side of the fender section 51. These rods 72 are adapted to retain the plungers 64 within the cylinders 65, as well as to impart shocks from the fender to the rod 70 and thence toward the central portion of the vehicle.

The back side of the fender section 51 is provided with still other backwardly extending lugs 54ᵈ which are longitudinally slotted and pivotally connected by means of pins to the forward ends of arms 36ᵇ extending forwardly from and integrally secured at their rear ends to the ends of the slotted portions 36ª of the steering arms 36, as shown best in Figs. 3 and 8. The pins pivotally connecting the lugs 54ᵈ to the arms 36ᵇ, are normally held toward the outer ends of the slots in said lugs, by means of compression springs 73 positioned in said slots. Thus, when the front wheels are turned, the fender is held in front of the wheels at all times, such movement of the fender being permitted by the several pivotal connections of the plungers 64 and links 72. The shock against the fender is not transmitted to the arms 36ᵇ by reason of the springs 73, the extreme impact from the shock being absorbed by the springs 67.

The means for converting the shocks against the bumpers and fender into the desired motion for automatically applying the brakes of the vehicle, is positioned at the central portion of the frame 1, and is supported thereon by a pair of spaced apart braces 81 extending transversely to and secured at their ends to the side members of the main frame. Said means consists essentially of a main casing 82 supported at the upper sides of the braces 81, a spring casing 83, positioned within and spaced from the casing 82, and rotatable relative thereto, a spindle 84 extending vertically through the central portions of the casings 82 and 83 and rotatable independently of either, a spiral spring 85 secured at its outer end to the spring casing 83 and at its inner end to the spindle 84, plungers 85 reciprocally mounted on and extending through the side walls of the casing 82 at right angles to each other at the forward, rear and lateral sides of the casing 82, levers 87 pivotally mounted intermediate their ends on and within the casing 82 outside of the casing 83 and pivotally connected at their one ends to longitudinally slotted portions at the inner ends of the plungers 87, links 88 pivotally connecting the opposite ends of said levers to gears extending outwardly from and secured to the spring casing 83 and a brake actuating arm 89 secured to the lower end of the spindle 84 and extending toward the one side of the vehicle.

The ends of the plungers 86 extending beyond the casing 82 are secured intermediate the ends of transversely positioned rods 90, and the outer ends of the plungers 86, extending through the lateral sides of the casing 82, are secured intermediate the ends of longitudinally extending rods 91. The ends of the rods 90 and 91 are interconnected in any suitable manner so that said rods serve as guides for each other. The transverse rods 90 are pivotally connected intermediate their ends and at their central positions, by means of links or rods 92 to corresponding positions on the square, slidably mounted bumper supporting member 20 at the rear end of the vehicle and the fender supporting member 70 at the front end thereof, it being noted, however, that the front transversely positioned rod 90 connected to the front plunger 86, is connected to the square bumper supporting member 70 by only two rods 92. The longitudinally extending rods 91 connected to the plungers 86 extending through the lateral sides of the casing 82, are similarly connected by links or rods 93 to various portions on the side bumper supporting member 21, as shown best in Fig. 1.

The brake pedal 7 is pivotally connected by means of a pivotally jointed brake actuating rod 101 to the end of the brake actuating arm 11 mounted on the brake rod 10. The free end of the arm 89 connected to the means in the central portion of the vehicle, is connected by a slotted portion in its end to the brake actuating rod 101. The forward end of the rod 101 is bifurcated, the one furcation being pivotally connected to the brake pedal 7, as described, and the other furcation being pivotally connected to the clutch pedal 8, as shown in Figs. 1, 3 and 4. The furcation 101$^a$ is longitudinally slotted, as indicated by 101$^b$, in Fig. 4, so as to permit the clutch to be actuated or thrown out independently of the actuation of the brakes.

Contiguous to and preferably behind the foot pedals, is rotatably mounted a release lever supporting shaft 102 on which is secured a release lever 103 which is normally held in its forward position and also in any brake releasing position by a quadrant 104 and a pawl 105 mounted on said lever and adapted to engage various notches in the quadrant 104. On this shaft is also mounted a brake release arm 106, the outer end of which is longitudinally slotted, as shown best in Fig. 5. Through this slotted portion of the brake release arm and through a longitudinal slot 101$^c$ in the brake actuating rod 101, is positioned a pin 107 for pivotally connecting the arm 106 with the rod 101. Between the pin 107 and the rear end of the slot 101$^c$, is positioned a compression spring 108 which, when the brake release means is in an inoperative position, as shown in Fig. 5, exerts a slight tension on the brake actuating rod 101 and holds the same and the brake pedal in a backwardly shifted position.

The auxiliary means for checking the forward speed of the vehicle consists of yieldable blocks 110, which may be made of rubber or other yieldable material, and which are normally held in line with and in front of the rear wheels and a considerable distance above the ground, but which, when released, are projected immediately in front of the rear wheels against the ground and permits such rear wheels to mount the block or members 110, raising the wheels from the ground, permitting the members 110 to drag on the ground and thus facilitate the checking of the forward speed of the vehicle. These blocks are supported on brackets 111, depending from the main frame 1 of the vehicle, as shown in Figs. 2 and 9, in front of and inwardly from the rear wheels 4. In these brackets are rotatably mounted supports 112 which extend outwardly therefrom and are provided at their outer ends with guide portions 112$^a$. In these guide portions are reciprocally mounted the brake block supporting rods 113 to the lower ends of which the block 110 is secured. Around these rods 113 and between the blocks 110 and the guide portions 112$^a$, are positioned compression springs 114 which are adapted to force and project downwardly the blocks 110 when the rods 113 are released. These rods 113 are held in angular positions so as to facilitate the projection of the blocks as near to the wheels as possible, and are held in such angular positions by means of pins 115 which extend through the supporting members 112 contiguous to the outer sides of the journal portions of the brackets 111 and are adapted to engage abutments 112$^b$ at said outer sides of the brackets. The supporting members 112 are held in the positions stated with the pins 115 in engagement with the abutments 112$^b$ by means of springs 116 at the inner ends of the supporting members, said springs being secured at one end to the supporting member and at the other end to the brackets. Thus, the block supporting rods are prevented by the pin from being shifted forwardly, but permitted to be shifted toward the wheels when the blocks strike the ground, thus permitting the wheels to mount said blocks.

The upper ends of the rods 113 are provided with enlarged portions 113$^a$ which prevent said rods from being removed from the guide portions 112$^a$. Such enlarged portions also serve another function, namely, that of holding the rods in their withdrawn or raised positions. These enlarged portions are engaged, when the rods are raised, by means of pawls 121 which are secured to the ends of a rod 122 extending through and beyond and rotatably mounted on the side members of the main frame 1. This rod 122 is provided intermediate its ends with a downwardly extending arm 123 which is pivotally connected by means of a link 124 to an arm 125 extending outwardly from the spring casing 83, but positioned within the enclosing casing 82. Thus, as the spring casing 83 is rotated, the rod 122 is rotated and the pawl 121 shifted from disengaged relation with the enlarged portion 113$^a$ at the upper end of the block supporting rod 113.

The lever 103 is adapted for releasing the brake after the same has been applied automatically by my apparatus. I have utilized this same lever, 103, for raising the brake blocks 110 from their braking or blocking positions. On the shaft 102 is mounted an arm 131 which extends downwardly. To the lower end of this arm is connected a cable 132 which extends over a sheave 133 and thence backwardly. The rear end of this cable is divided into two cables 134 which extend around other pulleys 135 toward the opposite sides of the vehicle. The ends of said cables 134 extend around other sheaves 136, substantially in line with the rods 113, and thence downwardly, and are secured at their ends, directly to or to arms projecting laterally from the upper ends of the block supporting rods 113. Thus, when the lever 103 is shifted backwardly, the rods 113, carrying the blocks 110, are raised permitting the pawls 121 to be engaged again by the enlarged portions at the upper ends of said rods 113.

The operation of the apparatus is as follows:

Although the several springs forcing the several bumper sections at the center, as well as the members supporting the former, outwardly absorb the greater portion of the shock, due to the collision of obstacles with the bumper and fender, said springs are sufficiently strong to impart the motion of the bumper sections and the fender to the spring casing 103 for rotating the same. It will be noted that the slots at the inner ends of the plungers 86 permit only the actuated plunger to be shifted inwardly and permit the levers 87 not connected with the actuated plunger to be merely pivoted about their axes. As the spring casing 83 is rotated, the rotary motion thereof is imparted through the spiral spring to the vertical spindle and thence to the brake actuating rod 101, the backward motion of the latter applying the brakes. Simultaneous with the brake applying operation, the brake blocks 110 are projected downwardly by the springs 114 as the block supporting rods 113 are released by the pawls 121, as described above. The vehicle cannot be moved until both the brakes are released and the blocks 110 raised. In order to perform this operation, the lever 103 is shifted backwardly and locked in such backwardly shifted position by the pawl 105 engaging the quadrant 104. The backward shifting of the lever 103 compresses the spring 108 slightly, but also forces the brake actuating rod 101 backwardly for releasing the brakes. the spring 108 being of sufficient strength to overcome the action of the spiral spring 85. As the lever 103 is shifted backwardly, the brake blocks 110 are raised, as described above. The brake releasing position of the lever 103, however, does not prevent the clutch from being released to connect the engine with the driving mechanism, nor the brakes from being again applied by the brake pedal. The resistance to the releasing of the clutch and the applying of the brakes when the lever 103 is shifted backwardly, however, is considerable and aside from the releasing of the brakes, the difficulty of operation of the clutch pedal and the brake pedal is a reminder that the brakes are released by the lever 103.

As an auxiliary means to the vehicle, there is provided the signal 140 which may be electricity or other means. With the lettering "Stay four feet away", 140$^a$ is the left end of the signal 140, and other means "Turning left," 140$^b$ the right end of said signal 140, means "Turning right", which shall be illuminated or reflected by means of automatic switches or steerage in order to notify operators of other vehicles so they will not collide with the vehicle signaling.

Though I have shown and described a particular construction, combination and arrangement of parts and portions, and particularly application of my apparatus to vehicles, I do not wish to be limited to this particular construction, combination and arrangement, and the particular adaptation to vehicles, but desire to include in the scope of my invention the construction, combination and arrangement as the same may be applied to other vehicles, and conveyances, such as automobiles, motorcycles, trucks, stages, locomotives, street cars, trains, and the like, substantially as set forth in the appended claims.

Having thus described my invention, what I claim as new and desire to secure by Letters Patent is:

1. In an apparatus of the class described, a vehicle chassis, a plurality of rigid bumper sections positioned at the outer sides of the chassis and spaced therefrom, the several bumper sections being pivotally connected together and adapted to yield independently of each other, and bumper section supporting members yieldably supported by the frame of the chassis for yieldably supporting said bumper sections relative to the chassis.

2. In an apparatus of the class described, a vehicle chassis, a plurality of rigid bumper sections positioned at the outer sides of the chassis and spaced therefrom, the several bumper sections being pivotally connected together and adapted to yield independently of each other, bumper section supporting members shiftably and yieldably supported by the frame of the chassis and independently of each other, and yieldable means supporting said bumper sections on said supporting members at the outer sides of the latter.

3. In an apparatus of the class described, the combination with a vehicle chassis, including a frame, wheels mounted thereon and having a main brake mechanism operatively associated with said wheels, of bumper means shiftably mounted on said frame, means connecting said bumper means with the main brakes, and an auxiliary brake mechanism for the wheels comprising brake blocks mounted on said frame in front of said wheels and adapted to be projected in front of the latter, said main brakes being applied and said brake blocks being projected in front of said wheel when said bumper means is shifted.

4. In an apparatus of the class described, a vehicle chassis, a plurality of bumper sections positioned at the outer sides of the chassis and spaced therefrom, the several bumper sections being pivotally connected together and adapted to yield independently of each other, bumper section supporting members yieldably supported by the frame of the chassis and yieldable brake actuating means rotatably mounted on said frame and operatively connected to said bumper section supporting members.

5. In an apparatus of the class described, a vehicle chassis, a plurality of bumper sections positioned at the outer sides of the chassis and spaced therefrom, the several bumper sections being pivotally connected together and adapted to yield independently of each other, bumper section supporting members yieldably supported by the frame of the chassis for yieldably supporting said bumper sections relative to the chassis, yieldable means rotatably mounted on said frame and connected to said bumper section supporting member, brake operating levers connected to said yieldable rotating means, and brake blocks positioned in front of the wheels of the chassis and operatively connected with said yieldable rotating means.

6. In an apparatus of the class described, the combination with a vehicle chassis, including a frame, wheels mounted thereon and having a main brake mechanism operatively associated with said wheels, of bumper means shiftably mounted on said frame, means connecting said bumper means with said main brakes whereby the latter are applied when said bumper means is shifted, an auxiliary brake mechanism for the wheels comprising brake blocks slidably mounted on the frame in advance of the wheels and operatively connected with the main brake actuating means, and means for releasably securing said brake mechanisms in applied position and arranged for actuation by said bumper means.

7. In an apparatus of the class described, the combination with a vehicle chassis, including a frame, wheels mounted thereon and having a main brake mechanism operatively associated with said wheels, of bumper means shiftably mounted on said frame, means connecting said bumper means with said main brakes, an auxiliary brake mechanism for the wheels comprising brake blocks mounted on said frame in front of said wheels and adapted to be projected upon the ground in front of the latter, said main brake mechanism being applied and said brake blocks being projected in front of said wheels when said bumper means is shifted in one direction, and manually operable releasing means in connection with said main brake mechanism and said brake blocks for releasing said main brakes and withdrawing said brake blocks from in front of said wheels and for returning said bumper means to its original position.

8. In an apparatus of the class described, the combination with a vehicle chassis, including shiftable front wheels having steering means for shifting said wheels, and brake means for certain of the vehicle wheels, of bumper means positioned at the outer sides of said wheels, means supporting said bumper means on said chassis, said bumper means being shiftable relative to said supporting means, and other means connecting said bumper means to said steering means whereby said bumper means is shifted relative to its supporting means, said supporting means being connected to said brake means.

9. In an apparatus of the class described, the combination with a vehicle chassis, including shiftable front wheels having steering means for shifting said wheels, and brake means for certain of the vehicle wheels, of bumper means positioned at the outer sides of said wheels, means supporting said bumper means on said chassis, said bumper means being shiftable relative to said supporting means, and other means connecting said bumper means to said steering means whereby said bumper means is shifted relative to its supporting means, ratchet and pawl means in connection with said bumper means and said supporting means whereby the supporting means is shifted inwardly when said bumper means is shifted, and means connecting said supporting means to said frame.

10. In an apparatus of the class described, a vehicle chassis, yieldable bumper means supported outwardly thereof, a rotatable member carried by the chassis and operatively connected for actuation upon the movement of said bumper means, and a brake mechanism operatively connected for actuation by said rotatable member.

11. In an apparatus of the class described, a vehicle chassis, yieldable bumper means supported outwardly of each side and each end of the chassis, a rotatable member carried by the chassis, rectilinearly movable means operatively connecting the rotatable member with each side and end portion of the bumper, a brake mechanism, and rectilinearly movable means operatively connecting the rotatable member with said brake mechanism.

12. In an apparatus of the class described, a vehicle chassis, a yieldable bumper means supported outwardly of each side and each end of the chassis, a rotatable member carried by the chassis, rectilinearly movable means operatively connecting the rotatable member with each side and end portion of the bumper and adapted for independently actuating said rotatable member, a brake mechanism, and rectilinearly movable means operatively connecting the rotatable member with said brake mechanism.

13. In an apparatus of the class described, a vehicle chassis, yieldable bumper means supported outwardly of each side and each end of the chassis and composed of pivotally connected rigid sections adapted for independent movement, a rotatable member carried by the chassis, individual means mounted for rectilinear movement and operatively connecting the rotatable member with the respective side and end portions of the bumper, and adapted for independently actuating said rotatable member, a brake mechanism and rectilinearly movable means operatively connecting the rotatable member with said brake mechanism.

F. M. McDONALD.